(12) United States Patent
Kishimoto

(10) Patent No.: US 6,216,060 B1
(45) Date of Patent: Apr. 10, 2001

(54) BICYCLE DISPLAY APPARATUS SWITCHABLE INTO DIAGNOSTIC MODES

(75) Inventor: Hitoshi Kishimoto, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/108,865

(22) Filed: Jul. 1, 1998

(30) Foreign Application Priority Data

Jul. 2, 1997 (JP) .................................................... 9-191997

(51) Int. Cl.[7] ............................... G06F 17/00; G06F 7/00
(52) U.S. Cl. ............................ 701/1; 701/49; 340/427; 340/432; 340/438; 340/439
(58) Field of Search .................. 701/1, 44, 46, 701/49; 340/432, 438, 439, 441, 427, 901; 368/22, 70

(56) References Cited

U.S. PATENT DOCUMENTS

| | | | |
|---|---|---|---|
| 4,071,892 | 1/1978 | Genzling | 364/424 |
| 4,393,796 | 7/1983 | Dunn | 112/158 E |
| 4,636,769 | 1/1987 | Tsuyama | 340/134 |
| 4,642,606 | 2/1987 | Tsuyama | 340/134 |
| 4,859,984 | 8/1989 | Romano | 340/432 |
| 4,862,395 | * 8/1989 | Fey et al. | 702/146 |
| 5,213,548 | * 5/1993 | Colbert et al. | |
| 5,621,382 | 4/1997 | Yamamoto | 340/432 |
| 5,625,336 | * 4/1997 | Yamamoto | 340/432 |

FOREIGN PATENT DOCUMENTS

| | | | |
|---|---|---|---|
| 318461 A2 | 5/1989 | (EP) . | |
| 59-154616 | 10/1984 | (JP) . | |
| 60-249015 | 12/1985 | (JP) . | |
| 9-39612 | 2/1997 | (JP) | B60K/37/00 |

* cited by examiner

Primary Examiner—William A. Cuchlinski, Jr.
Assistant Examiner—Gertrude Arthur
(74) Attorney, Agent, or Firm—James A. Deland

(57) ABSTRACT

A bicycle display device includes a display having a plurality of display elements, an input circuit for inputting a plurality of sensor signals from a plurality of sensors, and a display control circuit for processing the plurality of sensor signals and for displaying information processed from the plurality of sensor signals on the display. An operating mode switch is provided for switching the display control circuit among a plurality of operating modes, wherein the plurality of operating modes comprises a normal operating mode, a display diagnostic mode, and an input diagnostic mode. A display mode switch is also provided for switching the type of data displayed on the display control circuit.

29 Claims, 4 Drawing Sheets

BICYCLE DISPLAY APPARATUS SWITCHABLE INTO DIAGNOSTIC MODES

BACKGROUND OF THE INVENTION

The present invention is directed to bicycle computers and, more particularly, to a bicycle computer that has diagnostic modes.

Display devices for displaying various types of data for bicycles, such as the bicycle speed, distance traveled and transmission gear, are frequently attached to bicycles. Display devices capable of displaying such a variety of parameters are equipped with switches for switching the type of parameter displayed and indicating the start and stop of measurement. The display device is also often detachably attached to the bicycle, with the switches often being integrally provided with the display device. It is known that the bicycle computer is easier to operate when these switches are disposed on lever brackets, such as brackets for fixing brake levers to the handle bar as shown in U.S. Pat. No. 4,071,892.

In the past, to determine whether such display devices were functioning properly, the display device had to be attached to the bicycle, signal lines had to be connected to the various sensors and manually operated switches, and the bicycle had to be operated while the shifter or the like was operated. When the display device was not operating properly, it was no easy feat to determine the cause of the trouble, which could have been caused by malfunctioning of the display means of the display device (liquid crystal display panel, light-emitting diode display panel, and the like), malfunctioning of the data processing means such as the CPU or the like inside the display device, or malfunctioning of the various sensors or the various signal lines from the sensors.

SUMMARY OF THE INVENTION

The present invention is directed to a bicycle computer wherein troubleshooting diagnostics may be carried out easily using the existing computer display and which allows the source of the malfunctions to be easily identified. In one embodiment of the present invention, a bicycle display device includes a display having a plurality of display elements, an input circuit for inputting a plurality of sensor signals from a plurality of sensors, and a display control circuit for processing the plurality of sensor signals and for displaying information processed from the plurality of sensor signals on the display. An operating mode switch is provided for switching the display control circuit among a plurality of operating modes, wherein the plurality of operating modes comprises a normal operating mode, a display diagnostic mode, and an input diagnostic mode. A display mode switch is also provided for switching the type of data displayed on the display control circuit.

In a more specific embodiment, when the display control circuit is in the display diagnostic mode, the display displays information indicating whether the plurality of display elements are functioning properly. For example, a numerical sequence may be displayed on numerical display elements and/or all display elements may be flashed at the same time. When the display control circuit is in the input diagnostic mode, the display displays information indicating whether the plurality of sensor signals are being received. For example, the display may flash a display element or display a numeral corresponding to the sensor.

DETAILED DESCRIPTION OF THE EMBODIMENTS

Figure 1:
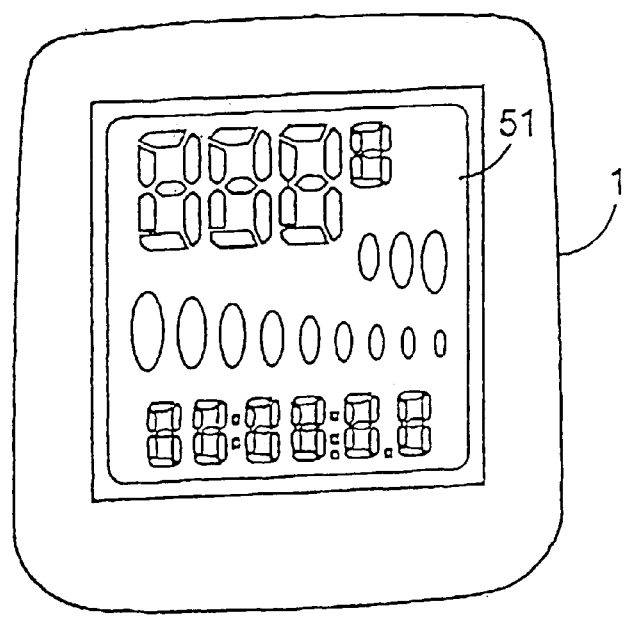
FIG. 1 shows a particular embodiment of a front face of a bicycle display device according to the present invention.

FIG. 1 shows a particular embodiment of a front face of a bicycle display device according to the present invention. As shown in FIG. 1, the display device frame 1 is constructed of a nearly square plate-shaped body with rounded corners. A liquid crystal panel 51 is attached as the display means to the front face of the display device frame 1. Several display elements are incorporated in the liquid crystal display panel 51, allowing various types of data such as speed, distance traveled, the shifter gear, time, etc. to be displayed as described below. Display panels based on light-emitting diodes and the like can also be used instead of liquid crystal display panels as the display means.

Figure 2:
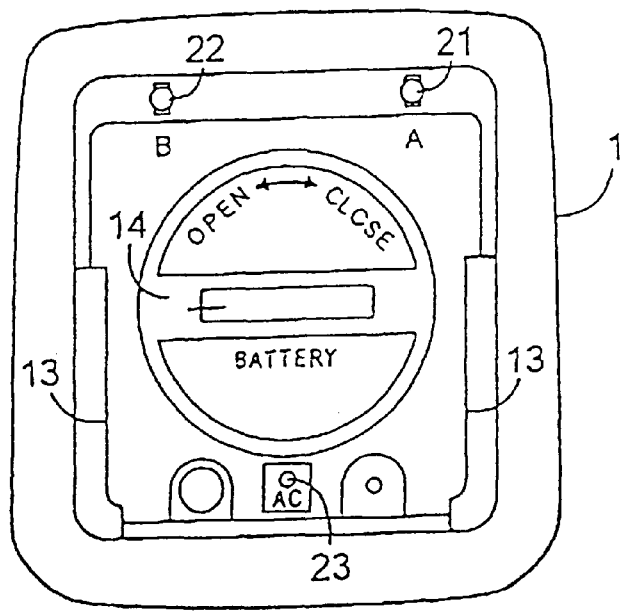
FIG. 2 show a particular embodiment of a back face of a bicycle display device according to the present invention.

As shown in FIG. 2, an attaching component 13 is formed on the back face of the display device frame 1 so that the frame 1 can be readily attached and detached with a clip (not shown in figure) fixed to the bicycle handle bar. A battery lid 14 can be removed with a coin or the like when the battery serving as the power source for the display device is replaced. An A switch 21 and B switch 22 for switching the operating mode of the display device are provided on the back face of the display device frame 1. An AC switch 23 for initializing data stored in the display device to factory settings and for resetting the display device is similarly provided on the back face.

Figure 3:
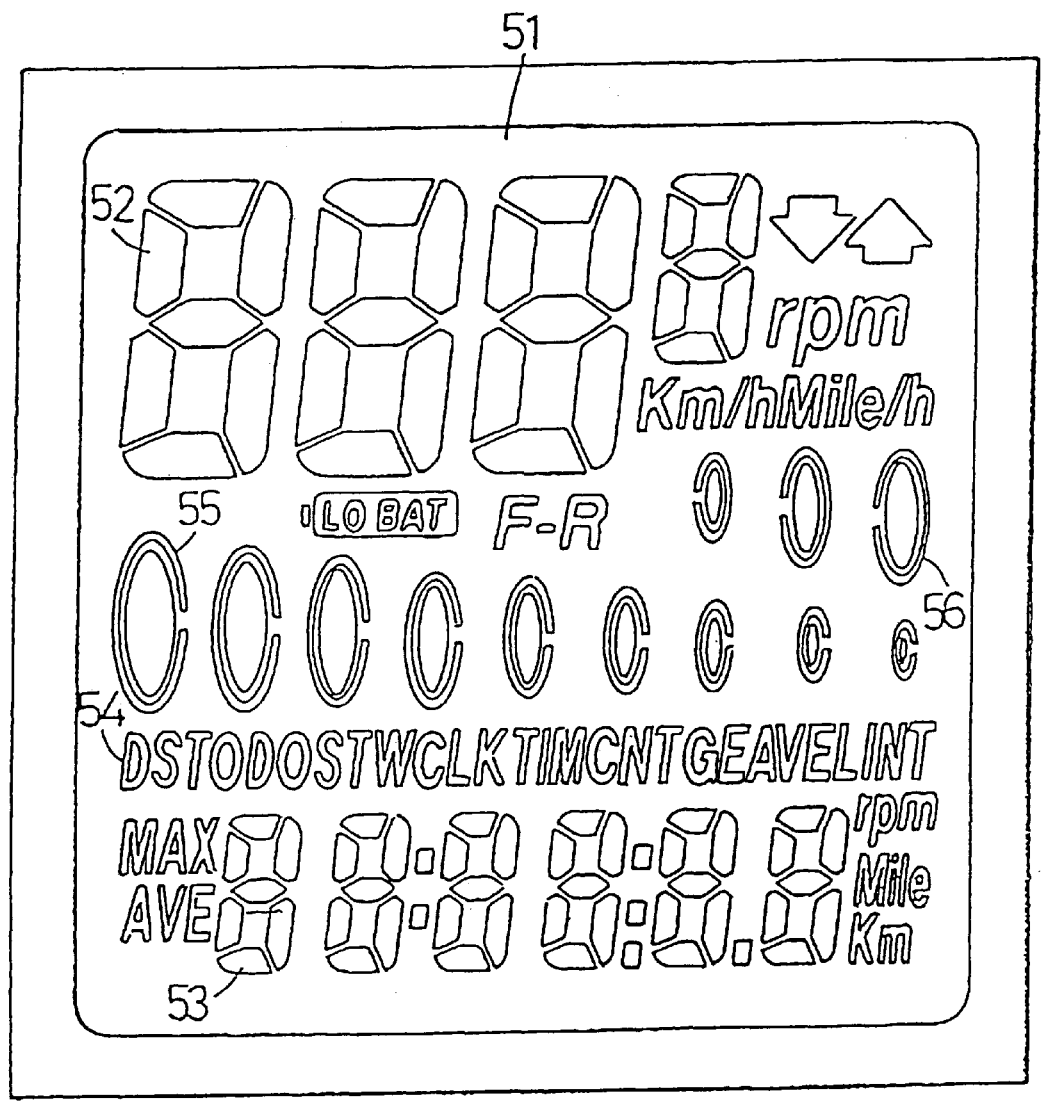
FIG. 3 shows a particular embodiment of the display elements contained on the front face of the bicycle display device shown in FIG. 2.

FIG. 3 shows a particular embodiment of the display elements contained on the front face of the bicycle display device shown in FIG. 2. As shown in FIG. 3, the bicycle speed, time, and other such data are displayed numerically in a main numerical display 52 and auxiliary numerical display 53. A content display 54 is a display showing the display contents of the main numerical display 52 and the auxiliary numerical display 53. For example, "VEL" indicates traveling speed, "DST" displays the distance traveled or the cumulative distance, "CLK" displays the time, "TIM" displays the traveling time, and "GEA" displays what gear the shifter is in. The speed units can be switched between kilometer per hour and miles per hour, and the units of distance can be switched between kilometers and miles. When the units of distance are set at the initial settings of the display panel, the unit display of the liquid crystal display panel 51 also displays the set units.

The rear sprocket speed step display 55 displays the sprocket speed step of the rear derailleur. The rear sprocket speed step display 55 consists of a display of disc shapes lined up according to size from left to right in descending order. This arrangement corresponds to the effective radius of the gears of the actual derailleur. At the initial settings of the display device, the speed steps of the front and rear derailleurs can be set so as to match the actual speed steps of the bicycle. For example, when the rear sprocket is in fifth gear, the rear sprocket speed step display 55 shows the five disc-shaped displays from the left and not the four on the right.

The front sprocket speed step display 56 displays the sprocket speed step of the front derailleur. The front sprocket speed step display 56 consists of a display of disc shapes lined up according to size from left to right in ascending order. When, in the initial settings, the front sprocket is in the second speed step, the front sprocket speed step display 56 shows the two disc-shaped displays from the left and not the one on the right. The rear and front sprocket speed step displays 55 and 56, respectively, are thus arranged so that the disc-shaped displays corresponding to the gear array of the actual derailleurs of the bicycle are in descending order. The speed step can thus be seen intuitively at a glance.

The positional relation between the group of figures in the front sprocket speed step display 56 and the group of figures in the rear sprocket speed step display 55 is such that the front sprocket speed step display 56 is set up in front or above, intuitively corresponding to the lay out of the actual derailleurs. When a signal (indicating the gear position) from the gear sensor located at the derailleur operating lever is detected, the disc-shaped displays corresponding to the current gear of the front and rear sprocket speed step displays 56 and 55 begin to blink, and the new gear is displayed. The gear can thus be known at a glance. The overall status of the sprocket speed step can also be promptly grasped.

In this embodiment, the start/stop switch 24 and the display mode switch 25 (see FIG. 5) are located apart from the display device frame 1 of the display device. The start/stop switch 24 is a switch for indicating the start and stop of measurement on the display device when the distance traveled, the lap time, or the like is displayed on the display device. The display mode switch 25 is a switch for switching the type of data displayed on the display device. These switches must be operated frequently by the operator while riding the bicycle and are therefore located near the usual grip position for right-handed riders. A lever bracket is a suitable location for these switches.

Figure 4:
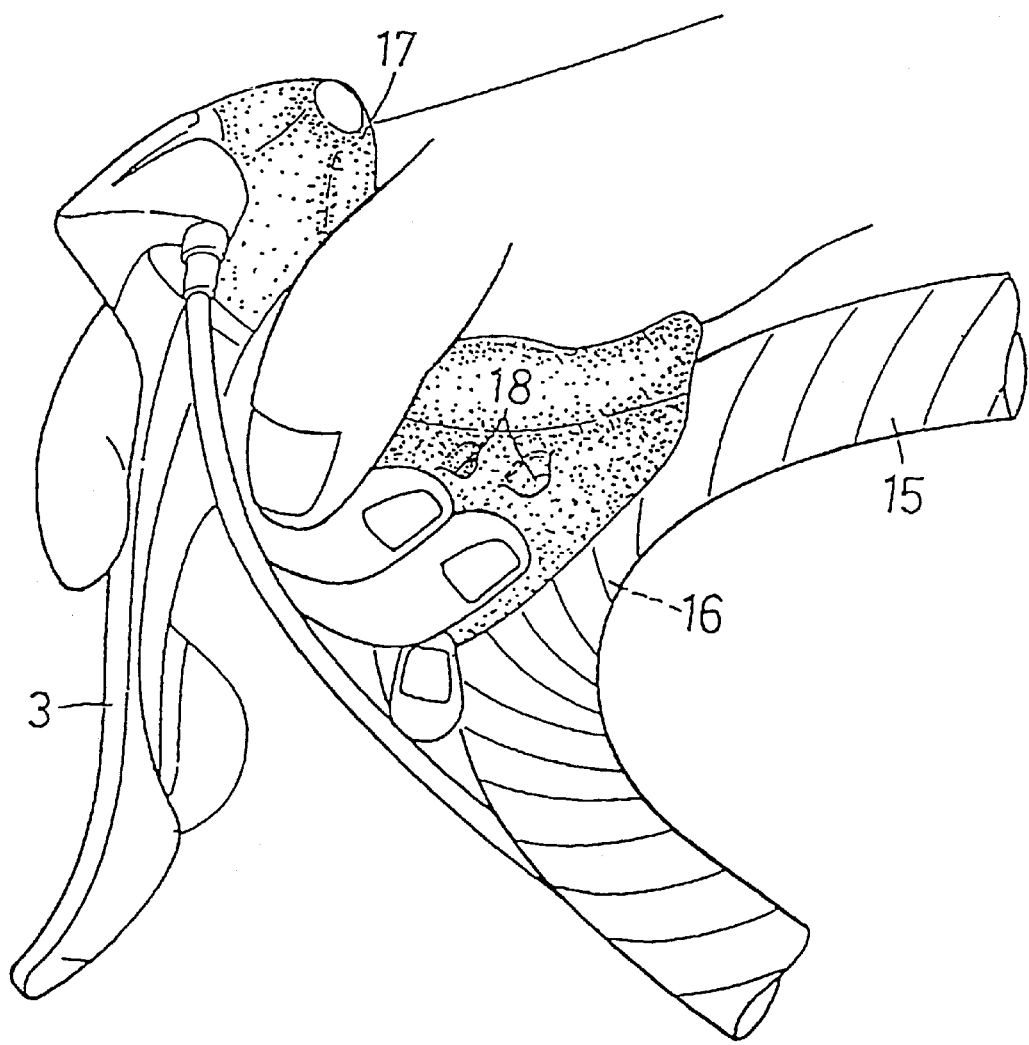
FIG. 4 shows a lever bracket/switch assembly that may be used with the bicycle computer shown in FIG. 1.

FIG. 4 depicts a lever bracket on the right side where the start-stop switch 24 and display mode switch 25 are located. The lever bracket is a bracket to which is attached an operating lever 3 allowing the brakes to be operated and the shifter to be operated. It is fixed to the bicycle handle bar 15 by a fixing band 16. The right side operating lever 3 allows the front brakes to be operated and the rear derailleur to be shifted. The entire outer surface of the lever bracket is covered with a synthetic resin bracket cover 17. An R gear sensor 32 (FIG. 5) for sensing the gear of the rear derailleur is located at the shift control (not shown in figures) inside the lever bracket, and it is connected by a signal cable to the input terminal 134 of the display device. Two push buttons 18 protrude from the bracket cover 17. The start/stop switch 24 and the display mode switch 25 of the display device are located inside the push button protrusions 18.

When the push buttons 18 are pressed, the bracket cover 17 is elastically deformed, allowing the switches to be operated. The height of the two push buttons 18, the shapes of the protrusions, the configuration of the textured pattern at the apex of the protrusions, and the like are different so as to allow them to be distinguished by touch. Since the protrusions can be distinguished by touch, the rider can tell which button is which and avoid pressing the wrong button without having to look at the buttons.

The push buttons 18 are conveniently located where they will be readily touched by the thumb when the operator grips the operating lever 3 to operate the brakes. More specifically, the push buttons 18 are located in a different place than is customary for the finger position on the inside of the grip component so as to prevent the switches from being inadvertently operated.

Figure 5:
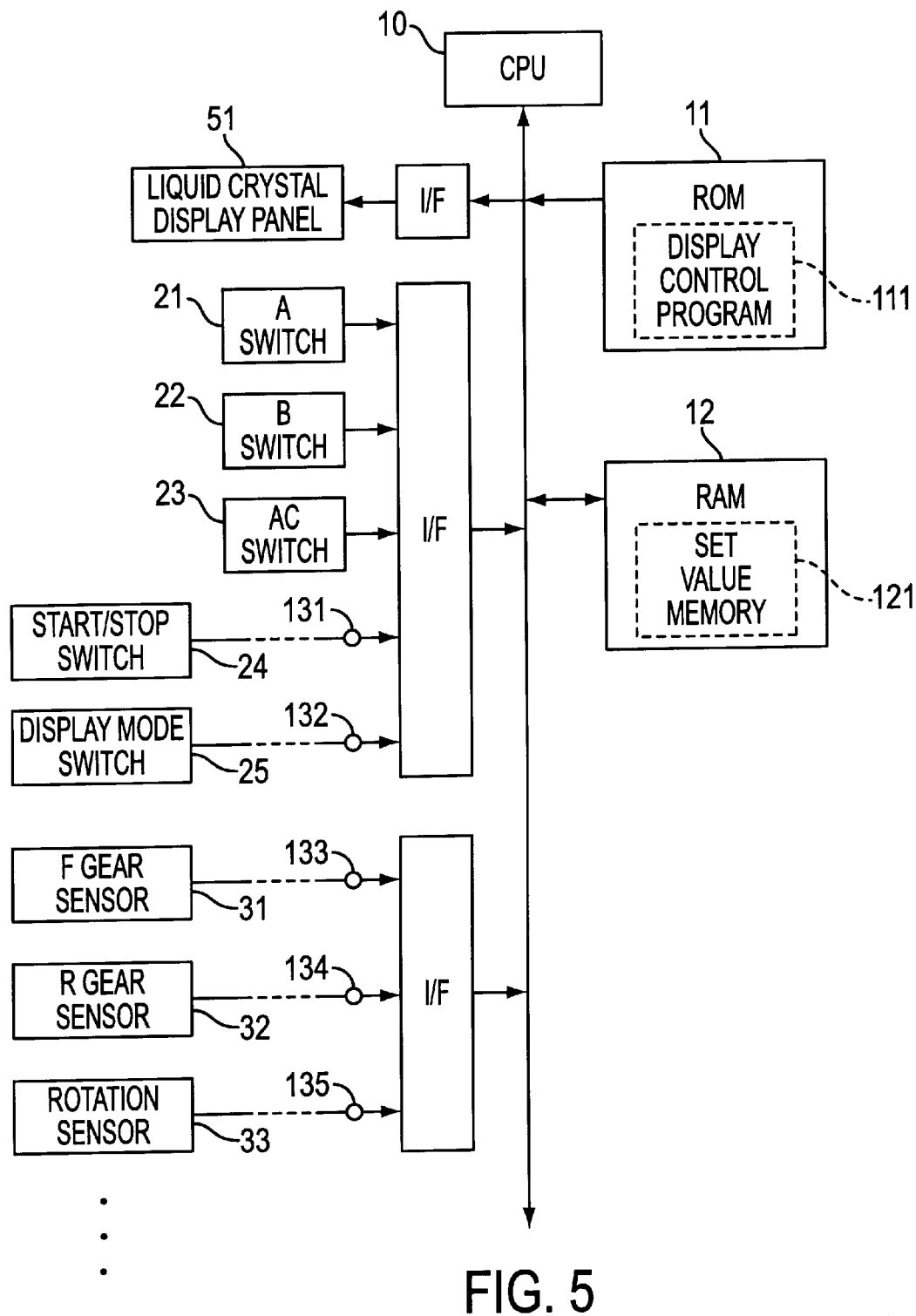
FIG. 5 is a block diagram showing a particular embodiment of electronic circuitry used in the bicycle computer according to the invention.

FIG. 5 is a block diagram showing a particular embodiment of electronic circuitry used in the bicycle computer according to the invention. A CPU 10 for data processing is located in the display device. ROM 11 and RAM 12 are connected as memory means by a bus to the CPU 10. A program and data are stored in the ROM 11 and RAM 12 to operate the CPU 10. That is, various types of data processing of the sensor signals from the sensors and the like take place in the ROM 11, and a display control program 111 for controlling the display of the liquid crystal display panel 51 of the display device is also stored there. The outer peripheral length of the tires, the speed steps of the front and rear derailleurs set to the initial settings in the display device, and the like are stored in the set value memory 121 in the RAM 12.

The liquid crystal display panel 51 is connected by a bus and interface circuit to the CPU 10, and the display of the liquid crystal display panel 51 is controlled by the CPU 10 and the display control program 111. The A switch 21, B switch 22, start/stop switch 24, and display mode switch 25 are also connected by the bus and interface circuit to the CPU 10. The CPU 10 senses when the switches are on and off. The start/stop switch 24 and display mode switch 25 are located apart from the display device and the like, and are thus connected by the signal cable to the input terminals 131 and 132. The AC switch 23 initializes the display device. When the AC switch 23 is pressed, the CPU 10 is reset, and the data stored in the set value memory 121 is initialized to the factory settings.

Various sensors such as the F gear sensor 31 for sensing the gear of the front derailleur, the R gear sensor 32 for sensing the gear of the rear derailleur, and the rotation sensor 33 for sensing the rotation of the tires are also connected by the bus and interface circuit to the CPU 10, and the output from these sensors is processed by the CPU 10. The signal cables from the various sensors are connected to the input terminals 133, 134, and 135 of the display device.

The display device described above is operated in the following manner. First, when the battery is set up in the display device, the main numerical display 52 and auxiliary numerical display 53 are set up to display the traveling speed and time. The display mode switch 25 can be pressed several times to switch display on the main numerical display 52 between distance traveled, gear numerical value display, maximum speed, average speed, and so forth. In the display mode showing the distance traveled on the main numerical display 52 and the lap time on the auxiliary numerical display 53, the start/stop switch 24 can be pressed to start and stop measurement.

The operating mode for thus displaying these various types of bicycle data is the normal mode for the display device. The operating mode of the display device is the display mode of the display control program 111 and the CPU 10 (the display control means). In addition to the normal mode, the operating modes of the display device include a display diagnostic mode for ascertaining whether or not the various display elements of the liquid crystal display panel 51 are operating properly, and an input diagnostic mode for ascertaining whether or not the sensor signals from the sensors and the switches are operating properly. A program for switching between these operating modes is included in the display control program 111. The operating modes are switched by the A switch 21 and the B switch 22. That is, the A switch 21 and B switch 22 function as operating mode switches for switching the operating mode of the display device.

The operating mode of the display device is in normal mode immediately after the battery of the display device has been replaced, or when the AC switch 23 is pressed to reset the display device. When the A switch 21 is continuously pressed for a first prescribed period of time in normal mode, the operating mode of the display device is switched to display diagnostic mode. A period of about 10 seconds, for example, can be set as the first prescribed period of time. In display diagnostic mode, the displays on the main numerical display 52 and auxiliary numerical display 53 of the liquid crystal display panel 51 switch between 0, 1, 2, and so forth at fixed intervals. When the display reaches 7, all the display elements then blink for a certain period of time, and the display again begins to switch between 0, 1, 2, and so forth. The display diagnostic mode makes it possible to ascertain whether or not the various display elements of the liquid crystal panel 51 are operating properly.

When the B switch 22 is continuously pressed for a second prescribed period of time in display diagnostic mode, the operating mode of the display device switches to input diagnostic mode. A period of about 2 seconds, for example, can be set as the second prescribed period of time. Input diagnostic mode makes it possible to ascertain whether or not the various sensors and switches are operating properly. The various sensors and remote switches are connected to the display device, and the display device is put into input diagnostic mode. In this embodiment, the "rpm" display element in the liquid crystal display panel 51 blinks when the rotation sensor 33 is operating properly as the tires are rotated. If it does not blink, the cause may be a malfunction of the rotation sensor 33, broken wires in the signal cables, defective connections in the terminal connections, or the like. The location of the malfunction can be readily determined.

When the operating lever 3 is operated to control shifting in input diagnostic mode, the gear display corresponding to the gear of the front and rear sprocket speed step displays 56 and 55 in the liquid crystal display panel 51 flash according to the current sensor signals from the F gear sensor 31 and R shift gear sensor 32. The switches are pressed to ascertain the operation of the switches. When the A switch 21 is pressed, the main numerical display 52 displays a 1. Similarly, when the B switch 22 is pressed, the main numerical display 52 displays a 2. When the display mode switch 25 is pressed, the main numerical display 52 displays a 3. When the start/stop switch 24 is pressed, the main numerical display 52 displays a 4.

When the B switch 22 is continuously pressed for the second prescribed period of time in input diagnostic mode, the operating mode of the display device returns to normal mode. The operating mode of the display device can thus be switched to display diagnostic mode and input diagnostic mode in addition to normal mode. As such, the operation of the display can be readily ascertained, and the source of trouble during malfunctions can be readily determined.

In display diagnostic mode, the operations can be checked with a single unit, even when the various sensors or remote switches are not connected. Display diagnostic mode also makes it possible to ascertain whether or not the display elements as well as the CPU 10, ROM 11, and RAM 12 are operating properly. That is, when the displays of the main and auxiliary numerical displays 52 and 53 are switched at fixed time intervals between 0, 1, 2, and so forth, this indicates that the CPU 10 is properly operating the display control program 111, and that the circuits are normal.

Similarly, input diagnostic mode makes it possible to check the operation of each sensor and switch, thus making it easy to determine the source of trouble and allowing malfunctions to be promptly repaired. That is, in the absence of displays confirming the operation of the sensors and switches, defects can be determined in a sensor itself, a signal cable, a connecting terminal, or the like.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. In the aforementioned embodiments, the start/stop switch and display mode switch were located on the right side lever bracket, but they can also be located at the left lever bracket for left-handed riders. When the display device is in input diagnostic mode, the operation of the sensors and switches was checked by the display on the liquid crystal display panel, but audio signals verifying operation may also be output from speakers at the same time that operations are checked by display on the liquid crystal display panel. In such cases, the audio signal frequency, pulse number output in the form of a pulse, time interval, or the like may be varied according to the type of switch or sensor.

Thus, the scope of the invention should not be limited by the specific structures disclosed. Instead, the true scope of the invention should be determined by the following claims.

What is claimed is:

1. A bicycle display device comprising:
   display means (51) having a plurality of display elements (52,53,54,55,56);
   an input circuit (133,134,135) for inputting a plurality of sensor signals from a plurality of sensors (31,32,33);
   a display control circuit (10,111) for processing the plurality of sensor signals and for displaying information processed from the plurality of sensor signals on the display means (51);
   an operating mode switch (21,22) for switching the display control circuit (10,111) among a plurality of operating modes;
   wherein the plurality of operating modes comprises a normal operating mode, a display diagnostic mode, and an input diagnostic mode;
   a display mode switch (25) for switching the type of data displayed on the display control circuit;
   wherein, when the display control circuit (10,111) is in the display diagnostic mode, the display means (51) displays information indicating whether the plurality of display elements (52,53,54,55,56) are functioning properly; and
   wherein the information indicating whether the plurality of display elements (52,53,54,55,56) are functioning properly is different from information that would be displayed to indicate a current running information of the bicycle.

2. The display device according to claim 1 wherein, when the display control circuit (10,111) is in the display diagnostic mode, the display means (51) displays a sequence of numerals.

3. The display device according to claim 2 wherein, when the display control circuit (10,111) is in the display diagnostic mode, the display means (51) displays numerals 0–7.

4. The display device according to claim 3 wherein, when the display control circuit (10,111) is in the display diagnostic mode, the display means (51) displays numerals 0–7 in numerical order.

5. The display device according to claim 1 wherein, when the display control circuit (10,111) is in the display diagnostic mode, the display means (51) activates each of the plurality of display elements (52,53,54,55,56).

6. The display device according to claim 5 wherein, when the display control circuit (10,111) is in the display diagnostic mode, the display means (51) activates each of the plurality of display elements (52,53,54,55,56) simultaneously.

7. The display device according to claim 6 wherein, when the display control circuit (10,111) is in the display diagnostic mode, the display means (51) flashes each of the plurality of display elements (52,53,54,55,56) simultaneously.

8. The display device according to claim 6 wherein, when the display control circuit (10,111) is in the display diagnostic mode, the display means (51) displays numerals 0–7 in numerical order.

9. The display device according to claim 1 wherein at least one of the operating mode switch (21,22) and the display mode switch (25) is located apart from the display means (51).

10. The display device according to claim 9 wherein the display mode switch (25) is located apart from the display means (51).

11. The display device according to claim 10 wherein the display mode switch (25) is disposed on a lever bracket for fixing an operating lever (3) to a bicycle frame.

12. The display device according to claim 1 further comprising a start/stop switch (24) for starting and stopping processing of the plurality of sensor signals.

13. The display according to claim 12 wherein the start/stop switch (24) is located apart from the display means (51).

14. The display according to claim 13 wherein the start/stop switch (24) is disposed on a lever bracket for fixing an operating lever (3) to a bicycle frame.

15. The display device according to claim 14 wherein the display mode switch (25) is disposed on the lever bracket.

16. A bicycle display device comprising:
    display means (51) having a plurality of display elements (52,53,54,55,56);
    an input circuit (133,134,135) for inputting a plurality of sensor signals from a plurality of sensors (31,32,33);
    a display control circuit (10,111) for processing the plurality of sensor signals and for displaying information processed from the plurality of sensor signals on the display means (51);
    an operating mode switch (21,22) for switching the display control circuit (10,111) among a plurality of operating modes;
    wherein the plurality of operating modes comprises a normal operating mode, a display diagnostic mode, and an input diagnostic mode;
    a display mode switch (25) for switching the type of data displayed on the display control circuit;
    wherein, when the display control circuit (10,111) is in the input diagnostic mode, the display means (51) displays information indicating whether the plurality of sensor signals are being received; and
    wherein the information indicating whether the plurality of sensor signals are being received is different from information that would be displayed to indicate a current running information of the bicycle.

17. The display device according to claim 16 wherein at least one of the operating mode switch (21,22) and the display mode switch (25) is located apart from the display means (51).

18. The display device according to claim 17 wherein the display mode switch (25) is located apart from the display means (51).

19. The display device according to claim 18 wherein the display mode switch (25) is disposed on a lever bracket for fixing an operating lever (3) to a bicycle frame.

20. The display device according to claim 16 further comprising a start/stop switch (24) for starting and stopping processing of the plurality of sensor signals.

21. The display according to claim 20 wherein the start/stop switch (24) is located apart from the display means (51).

22. The display according to claim 21 wherein the start/stop switch (24) is disposed on a lever bracket for fixing an operating lever (3) to a bicycle frame.

23. The display device according to claim 22 wherein the display mode switch (25) is disposed on the lever bracket.

24. The display device according to claim 16 wherein, when the display control circuit (10,111) is in the input diagnostic mode, the display means (51) flashes at least one of the plurality of display elements (52,53,54,55,56) when at least one of the plurality of sensor signals is being received.

25. The display device according to claim 16 wherein, when the display control circuit (10,111) is in the input diagnostic mode, the display means (51) displays a numeral corresponding to at least one of the plurality of sensor signals received.

26. The display device according to claim 25 wherein, when the display control circuit (10,111) is in the input diagnostic mode, the display means (51) displays a unique numeral corresponding to each of the plurality of sensor signals received.

27. A bicycle display device comprising:
    display means (51) having a plurality of display elements (52,53,54,55,56);
    an input circuit (133,134,135) for inputting a plurality of sensor signals from a plurality of sensors (31,32,33);
    a display control circuit (10,111) for processing the plurality of sensor signals and for displaying information processed from the plurality of sensor signals on the display means (51);
    an operating mode switch (21,22) for switching the display control circuit (10,111) among a plurality of operating modes;
    wherein the plurality of operating modes comprises a normal operating mode, a display diagnostic mode, and an input diagnostic mode;
    a display mode switch (25) for switching the type of data displayed on the display control circuit;
    wherein the plurality of sensor signals includes a wheel revolution sensor signal
    wherein, when the display control circuit (10,111) is in the input diagnostic mode, the display means (51) displays information indicating whether the wheel revolution sensor signal is being received; and
    wherein the information indicating whether the wheel revolution sensor signal is being received is different from information that would be displayed to indicate a current running information of the bicycle.

28. A bicycle display device comprising:

display means (51) having a plurality of display elements (52,53,54,55,56);

an input circuit (133,134,135) for inputting a plurality of sensor signals from a plurality of sensors (31,32,33);

a display control circuit (10,111) for processing the plurality of sensor signals and for displaying information processed from the plurality of sensor signals on the display means (51);

an operating mode switch (21,22) for switching the display control circuit (10,111) among a plurality of operating modes;

wherein the plurality of operating modes comprises a normal operating mode, a display diagnostic mode, and an input diagnostic mode;

a display mode switch (25) for switching the type of data displayed on the display control circuit; and wherein the plurality of sensor signals includes a gear position sensor signal;

wherein, when the display control circuit (10,111) is in the input diagnostic mode, the display means (51) displays information indicating whether the gear position sensor signal is being received; and wherein the information indicating whether the gear position sensor signal is being received is different from information that would be displayed to indicate a current running information of the bicycle.

29. A bicycle display device comprising:

display means (51) having a plurality of display elements (52,53,54,55,56);

an input circuit (133,134,135) for inputting a plurality of sensor signals from a plurality of sensors (31,32,33);

a display control circuit (10,111) for processing the plurality of sensor signals and for displaying information processed from the plurality of sensor signals on the display means (51);

an operating mode switch (21,22) for switching the display control circuit (10,111) among a plurality of operating modes;

wherein the plurality of operating modes comprises a normal operating mode, a display diagnostic mode, and an input diagnostic mode;

a display mode switch (25) for switching the type of data displayed on the display control circuit; and wherein the operating mode switch (21,22) includes a first operating mode switch (21) and a second operating mode switch (22), wherein the display control circuit (10,111) switches from the normal mode to the display diagnostic mode when the first operating mode switch (21) is activated for a predetermined time interval, and wherein the display control circuit (10,111) switches from the display diagnostic mode to the input diagnostic mode when the second operating mode switch (22) is pressed for a predetermined time interval.

* * * * *